United States Patent
Pliss et al.

(10) Patent No.: US 7,171,527 B2
(45) Date of Patent: Jan. 30, 2007

(54) METHOD AND APPARATUS FOR KEEPING TRACK OF MEMORY USAGE FOR TASKS IN A SHARED HEAP

(75) Inventors: Oleg A. Pliss, Santa Clara, CA (US); Bernd J. Mathiske, Cupertino, CA (US); Ioi K. Lam, Mountain View, CA (US); Vijay G. Nagarajan, Los Gatos, CA (US)

(73) Assignee: Sun Microsystems, Inc, Santa Clara, CA (US)

( * ) Notice: Subject to any disclaimer, the term of this patent is extended or adjusted under 35 U.S.C. 154(b) by 418 days.

(21) Appl. No.: 10/866,046

(22) Filed: Jun. 10, 2004

(65) Prior Publication Data

US 2005/0278497 A1    Dec. 15, 2005

(51) Int. Cl.
*G06F 12/00*    (2006.01)
*G06F 17/30*    (2006.01)

(52) U.S. Cl. ............... 711/153; 711/147; 711/173; 707/206

(58) Field of Classification Search .............. 711/147, 711/153, 170, 173; 707/206
See application file for complete search history.

(56) References Cited

U.S. PATENT DOCUMENTS

2001/0023478 A1* 9/2001 Ozawa et al. .............. 711/170
2003/0220952 A1* 11/2003 Borman et al. ............ 707/206

\* cited by examiner

*Primary Examiner*—Jack A. Lane
(74) *Attorney, Agent, or Firm*—Park, Vaughan & Fleming LLP

(57) ABSTRACT

One embodiment of the present invention provides a system that facilitates keeping track of memory usage of tasks in a shared heap without performing a full garbage-collection operation. The system operates by determining a memory usage by each task in a young generation of the shared heap. Once the memory usage for each task has been determined, the system then adds the memory usage for each task in the young generation of the shared heap to a global memory usage for each task (obtained during a preceding full garbage-collection operation) to produce an actual memory usage for each task.

30 Claims, 5 Drawing Sheets

METHOD AND APPARATUS FOR KEEPING TRACK OF MEMORY USAGE FOR TASKS IN A SHARED HEAP

BACKGROUND

1. Field of the Invention

The present invention relates to virtual machines within computer systems. More specifically, the present invention relates to a method and an apparatus for keeping track of memory usage for tasks in a shared heap without performing a full garbage-collection operation.

2. Related Art

The Java 2 Platform, Micro Edition (J2ME™), has become very popular in the wireless device space. Motorola, Nokia, NTT DoCoMo, RIM, Siemens, and many other key players in the wireless device industry have recently started shipping J2ME-enabled devices in very high volume. It has been estimated that over 200 million J2ME-enabled mobile phones were shipped in 2003 alone.

In order to effectively run applications on the new memory-constrained computing devices, a number of techniques have been developed to conserve memory. One promising technique involves providing a shared heap wherein objects from different tasks can be stored. This can greatly save memory space in comparison to the conventional technique of providing a separate heap for each thread. However, this shared heap technique complicates both garbage-collection operations and memory accounting operations.

In traditional non-memory-constrained computing systems, additional data structures, such as lookup tables, can be used to keep track of memory allocation by individual tasks. However, in memory-constrained computing devices, memory is extremely scarce. It is consequently impractical to use additional data structures to keep track of memory allocation, because the additional space used by the data structures would largely eliminate the space savings gained by using a shared heap.

Hence, what is needed is a method and an apparatus for keeping track of memory usage for tasks in a shared heap without the problems listed above.

SUMMARY

One embodiment of the present invention provides a system that facilitates keeping track of memory usage of tasks in a shared heap without performing a full garbage-collection operation. The system operates by determining a memory usage by each task in a young generation of the shared heap. Once the memory usage for each task has been determined, the system adds the memory usage for each task in the young generation of the shared heap to a global memory usage for each task (obtained during a preceding full garbage-collection operation) to produce an actual memory usage for each task.

In a variation on this embodiment, determining the memory usage for each task in the young generation of the shared heap involves performing a young generation garbage-collection operation on the young generation of the shared heap.

In a further variation, performing the young generation garbage-collection operation involves performing a marking operation to mark live objects in the young generation of the shared heap. For each object in the young generation of the shared heap, the system identifies a task that owns the object. If the object has been marked by the preceding marking operation, the system promotes the object to an old generation of the shared heap, and adds the memory usage for the object to the global memory usage for the corresponding task.

In a further variation, identifying the task that owns the object involves examining an object that is a boundary marker, wherein a boundary marker acts as a delimiter separating objects belonging to different tasks, and wherein each object is owned by the task that is identified by the last boundary marker preceding the object.

In a variation on this embodiment, identifying the task that owns the object involves examining a header of the object for an identifier that identifies the task.

In a further variation, the identifier is only present in objects in the young generation of the shared heap, and is removed when the object is promoted to the old generation of the shared heap.

In a variation on this embodiment, determining the task that owns the object involves examining a card table, wherein each task has a separate card table.

In a variation on this embodiment, the shared heap is located within a memory-constrained computing device.

In a variation on this embodiment, the shared heap is located within a platform-independent virtual machine.

In a further variation, the platform-independent virtual machine is a JAVA Virtual Machine.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Memory-Constrained Computing Device with a Shared Heap

Figure 1:
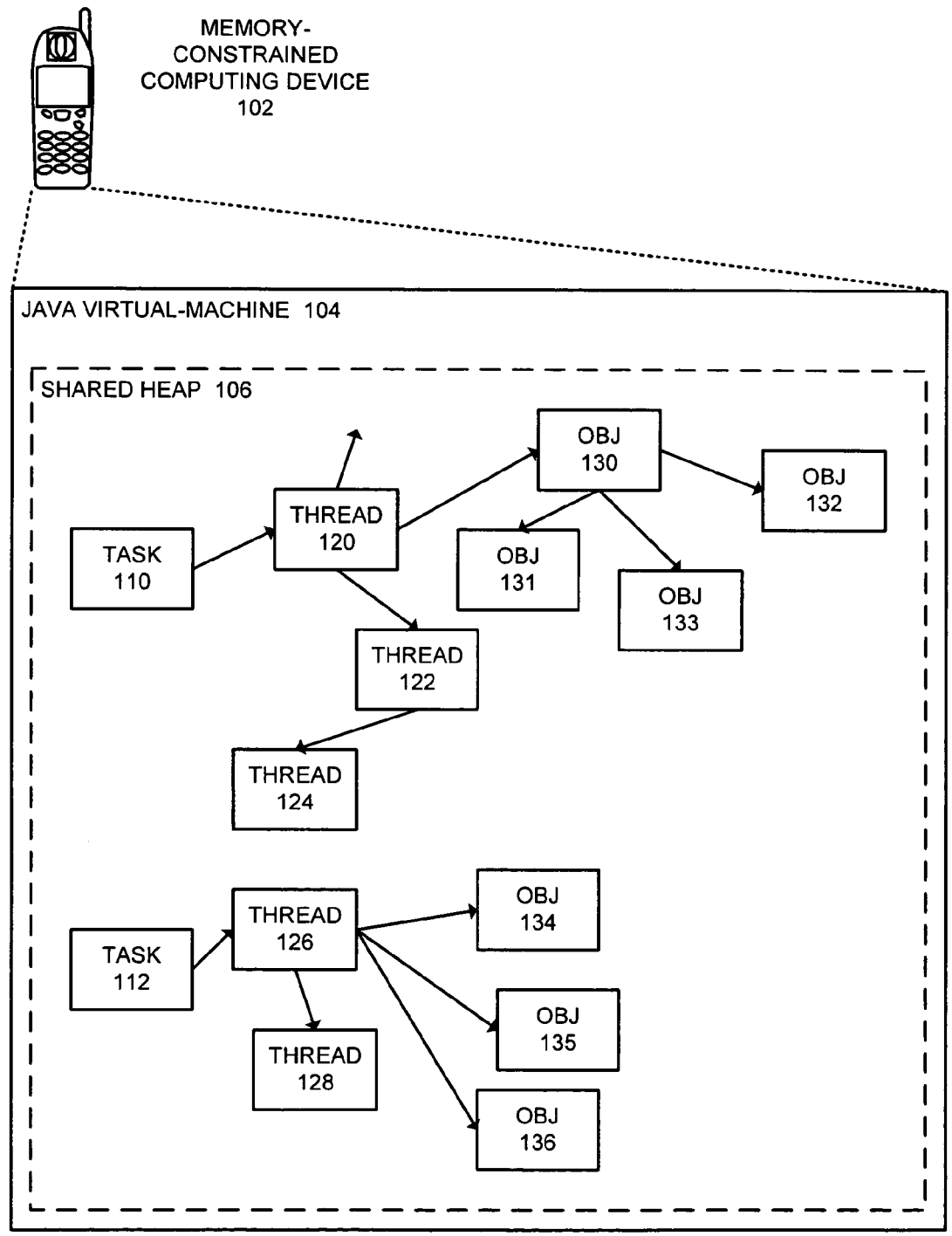
FIG. 1 illustrates a memory-constrained computing device with a shared heap in accordance with an embodiment of the present invention.

FIG. 1 illustrates a memory-constrained computing device 102 with a shared heap in accordance with an embodiment of the present invention. Memory-constrained computing device 102 can include any type of computing device, including, but not limited to, a cell phone, a computer system based on a microprocessor, a digital signal processor, a portable computing device, a personal organizer, a device controller, and a computational engine within an appliance. Memory-constrained computing device 102 contains Java Virtual Machine (JVM) 104, which in turn contains shared heap 106. (The terms JAVA, JVM and JAVA VIRTUAL MACHINE are trademarks of SUN Microsystems, Inc. of Santa Clara, Calif.) Note that JVM 104 could be any type of platform-independent virtual machine, and is not meant to be limited to a Java Virtual Machine.

Shared heap 106 includes all of the tasks running on JVM 104, as well as the associated threads and objects. For example, in the illustrated embodiment, shared heap 106 includes task 110, and associated threads 120–124. Likewise, shared heap 106 also includes task 112, and associated threads 126–128. In addition, shared heap 106 includes objects 130–136 that are associated with the various threads.

Generational Shared Heap

Figure 2:
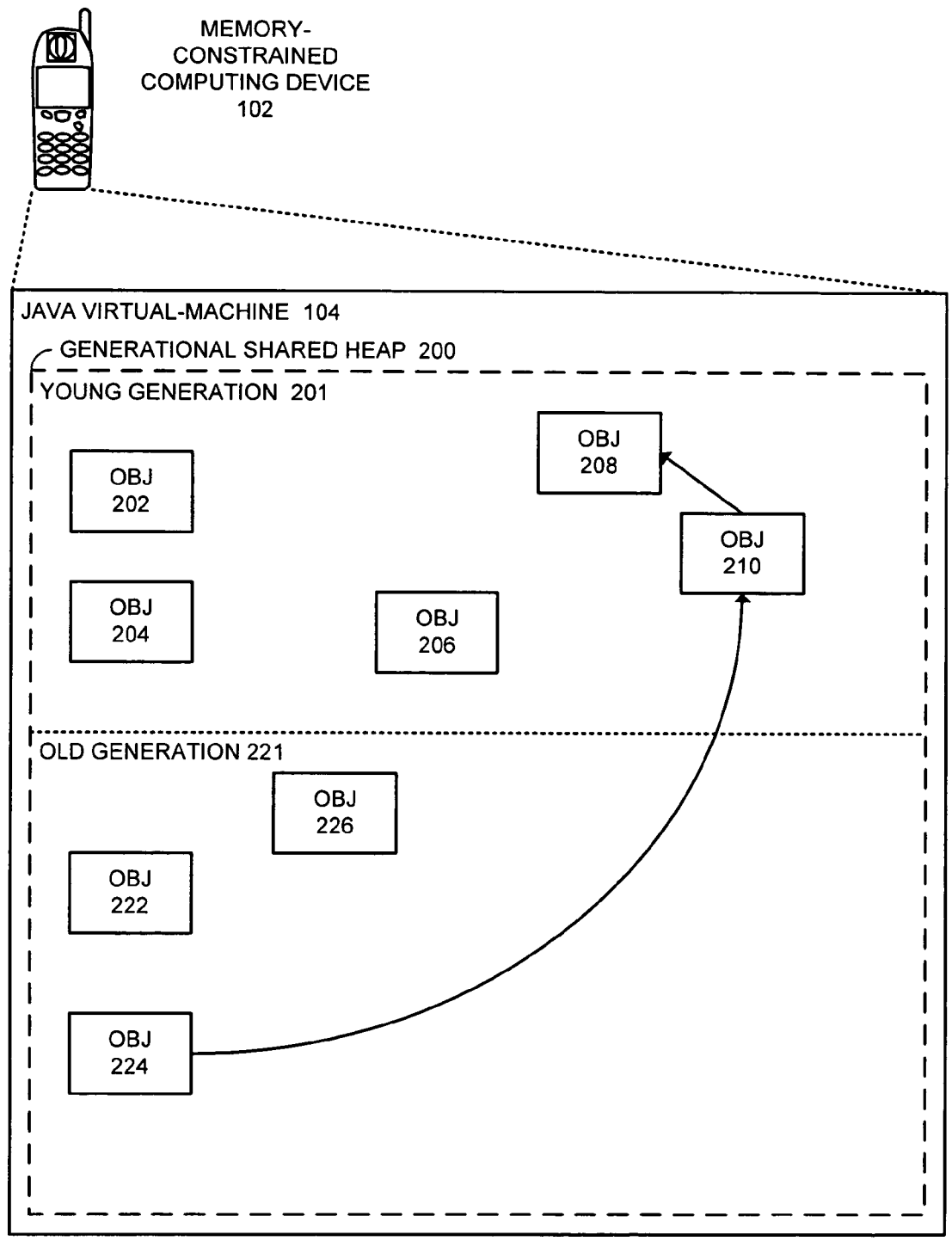
FIG. 2 illustrates a generational shared heap in accordance with an embodiment of the present invention.

FIG. 2 illustrates a generational shared heap 200 in accordance with an embodiment of the present invention. Note that generational shared heap 200 is partitioned into young generation 201 and old generation 221. In the example illustrated in FIG. 2, generational shared heap 200 is partitioned into two generations. However, generational shared heap 200 may be partitioned into any number of generations.

As objects are allocated to generational shared heap 200, they are allocated in young generation 201. During subsequent garbage-collection operations, all live objects in the young generation 201, such as objects 202–210, are promoted to old generation 221, and young generation 201 is available for subsequent allocation operations. Additionally, pointers that point to the objects that are being promoted need to be updated, such as object 224. Occasionally, it becomes necessary to perform a full garbage-collection operation, including old generation 221, to free space occupied by objects that are no longer live. Note that various methods for generational garbage collection exist, and virtually any of these can be used with the present invention.

Boundary Objects

Figure 3:
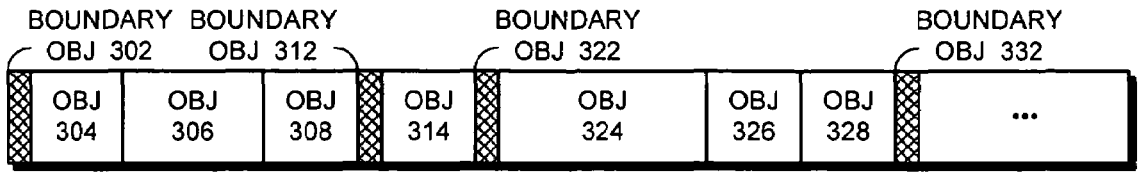
FIG. 3 illustrates boundary objects in accordance with an embodiment of the present invention.

FIG. 3 illustrates boundary objects in accordance with an embodiment of the present invention. In order to keep track of which objects are owned by which tasks, one embodiment of the present invention utilizes boundary objects. In this example, objects are allocated to young generation 201 consecutively from the beginning of young generation 201. Note that the present invention is not meant to be limited to starting from the beginning of young generation 201 or moving from the beginning to the end of young generation 201. Various methods exist that could start at virtually any place in young generation 201 and move through young generation 201 in any defined pattern.

As objects are allocated to young generation 201, the first object allocated is a boundary object, such as boundary object 302. Boundary objects are typically the minimum size possible that can accommodate an identifier for the task that owns the objects that follow the boundary object. Once the boundary object is allocated, objects are allocated for the task in consecutive memory locations following the boundary object. For example, objects 304–308 are owned by the task identified by boundary object 302, object 314 is owned by the task identified by boundary object 312, and objects 324–328 are owned by the task identified by boundary object 322. Note that the system may optionally allocate a termination boundary object, such as boundary object 332, at the end of the allocated space, wherein no additional objects are allocated after the termination boundary object.

If the system needs to allocate additional objects for a current task that the system has already allocated objects for, and the system has most recently allocated objects for other tasks, the system can allocate an additional boundary object identifying the current task, and can then allocate the additional object following the additional boundary object for the current task. For example, objects 304–308 may belong to task number one as identified by boundary object 302. Additionally, objects 324–328 may also belong to task number one as identified by boundary object 322, even though they are separated from objects 304–308 by intervening objects. In this way, the system does not have to allocate extra space for the current task in anticipation of subsequent requirements for the current task, as is necessary in most current systems.

In another embodiment of the present invention, the system attaches an identifier indicating the task that owns the object to the object's header. In this embodiment, the system does not use boundary objects to identify object ownership because each object would contain identification information for its owner.

In yet another embodiment of the present invention, the system may optionally maintain a separate card table for each task that facilitates identification of the objects that are owned by each task. When a young generation garbage-collection operation is performed, the system starts from global roots plus references from old generation 221 to young generation 201. Note that the system can easily separate global roots for different tasks, but cannot separate references from old generation 221 to young generation 201. In this embodiment, a write barrier intercepts assignments of pointers from young generation 201 to the fields of objects in old generation 221 and marks cards for these fields. At the moment of assignment, it is known to which task the reference belongs. Unless the write barrier uses separate card tables for each task, this task ownership knowledge will be lost after a task switch. Hence, when the system scans references from old generation 221 to young generation 201, it would not be possible to identify the ownership of the reference to young generation 201, and all objects reachable from this reference without the use of separate card tables. However, this embodiment requires memory to accommodate the card tables, and may not be practical in some situations.

Object Allocation

Figure 4:
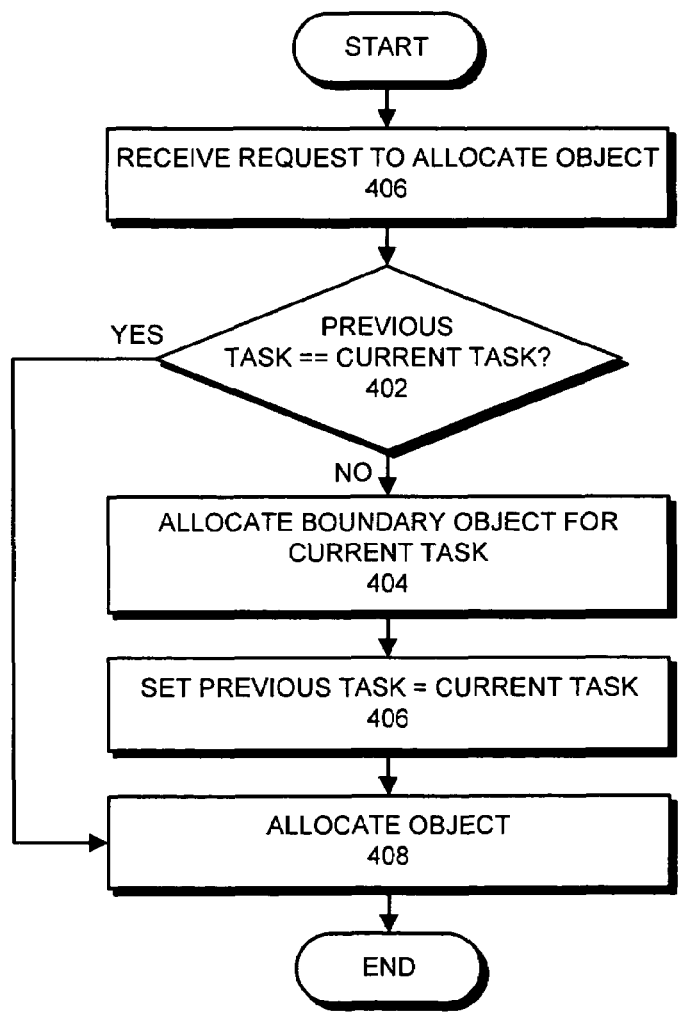
FIG. 4 presents a flowchart illustrating the process of object allocation in the young generation in accordance with an embodiment of the present invention.

FIG. 4 presents a flowchart illustrating the process of object allocation in young generation 201 in accordance with an embodiment of the present invention. The system starts by receiving a request from JVM 104 to allocate an object for a current task (step 401). Next, the system checks to see if the current task is the same as a previous task for the last object allocation (step 402). If so, the system skips to step 408 and allocates the object.

However, if the current task is not the same as the previous task, the system allocates a boundary object with an identifier for the current task (step 404). The system also sets the previous task indicator to match the current task to facilitate future object allocations (step 406). The system then allocates the object (step 408).

Full Garbage-Collection Operation

Figure 5:
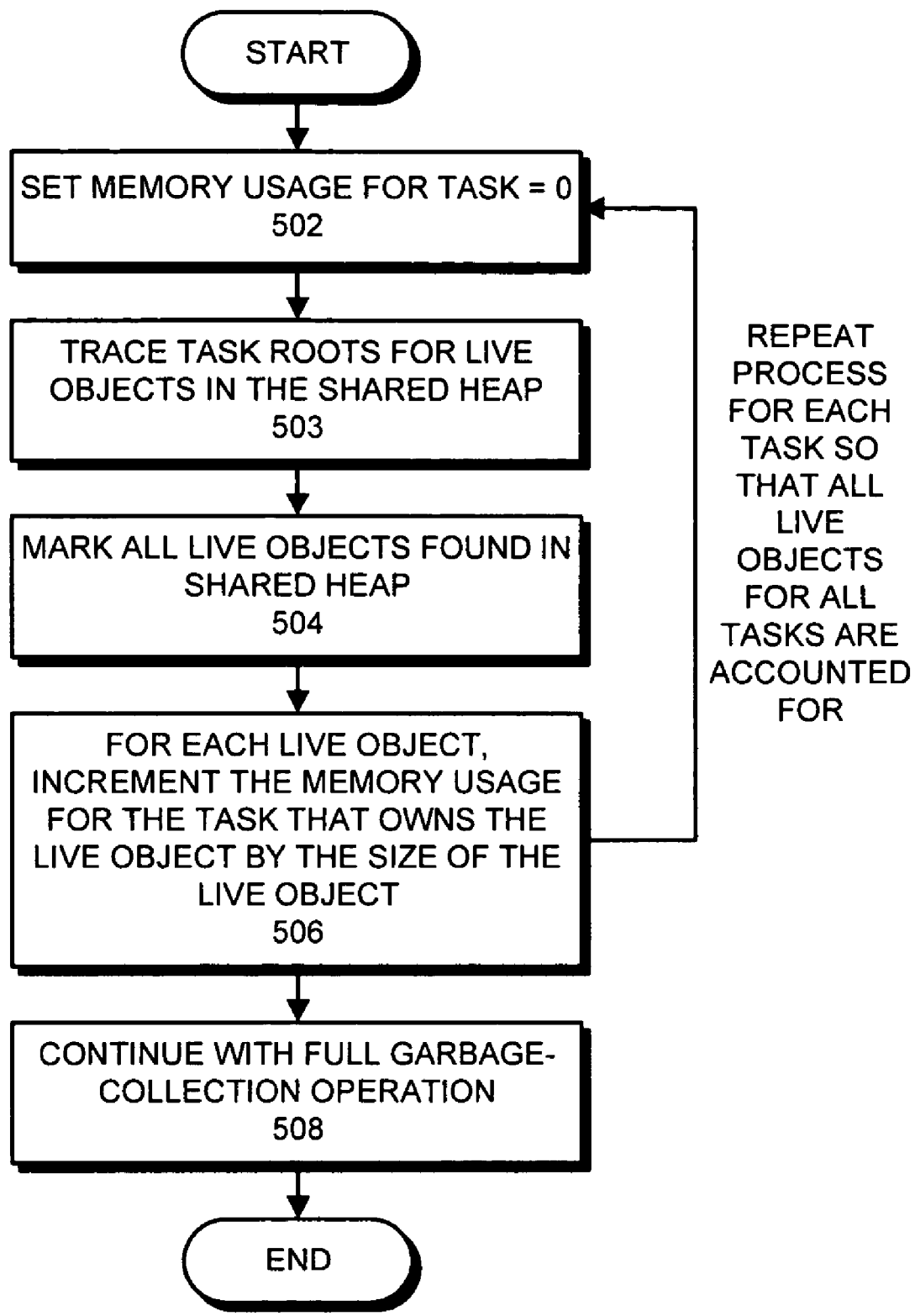
FIG. 5 presents a flowchart illustrating a full garbage collection in accordance with an embodiment of the present invention.

FIG. 5 presents a flowchart illustrating a full garbage-collection operation in accordance with an embodiment of the present invention. During a full garbage-collection operation, the system resets the memory usage for a task to 0 (step 502). Next, the system traces the task roots to identify live objects in generational shared heap 200 (step 503). As the live objects are identified, the system marks the live objects (step 504). In addition, for each live object, the system increments the memory usage for the task that owns the live object by the size of the live object to facilitate accounting of the total memory in use by each task (step 506). Note that the ownership of the object is determined by the task roots being traced. Also note that the steps 502–506 are repeated for each task so that all live objects for all tasks in generational shared heap 200 are accounted for. Once the marking operation has completed and the memory usage has been determined, the system continues with the normal full garbage-collection operation (step 508). Note that the illustrated embodiment in FIG. 5 uses a marking garbage-collection operation. However, any type of garbage-collection operation may be used.

Young Generation Garbage-Collection Operation

Figure 6:
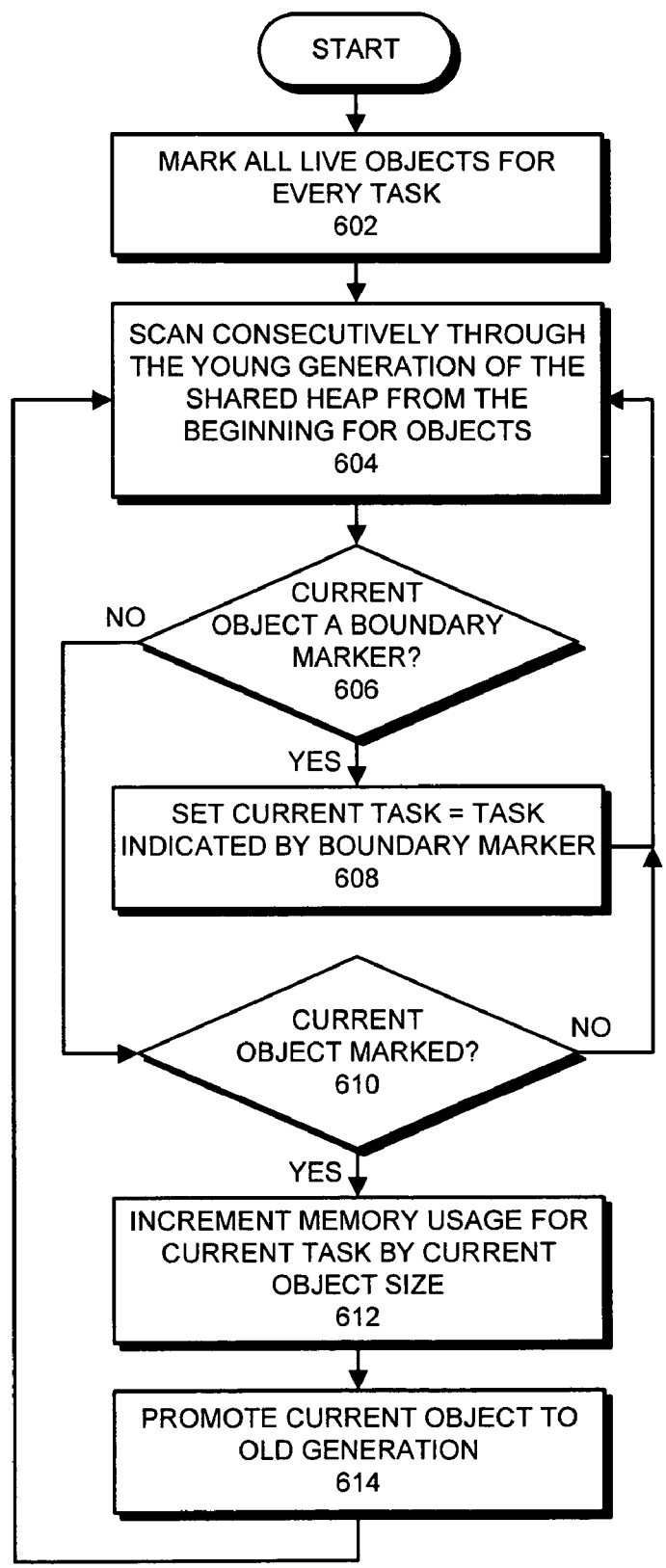
FIG. 6 presents a flowchart illustrating the process of a young generation garbage collection in accordance with an embodiment of the present invention.

FIG. 6 presents a flowchart illustrating the process of a young generation garbage collection in accordance with an embodiment of the present invention. From time to time it may be necessary to perform a garbage-collection operation on just the young generation 201 to free up space or to get an accurate accounting of the memory usage for each task. Note that whenever possible, young generation garbage-collection operations are preferred to old generation garbage-collection operations because they take less time.

The system starts by marking all live objects for every task in the young generation 201 (step 602). The system then scans consecutively through young generation 201 for objects from the beginning of young generation 201 (step 604). Upon finding an object, the system determines if the object is a boundary marker object (step 606). If so, the system sets the current task indicator to the task indicated by the boundary marker object (step 608), and continues to scan the young generation 201 for objects.

If the object is not a boundary marker object, the system determines if the current object is marked (step 610). If not, the system disregards the object and continues to scan the young generation 201 for objects. However, if the current object is marked, the system increments the memory usage for the current task by the size of the object (step 612) and promotes the object to the old generation 221 (step 614).

Note that as the objects are promoted from young generation 201 to old generation 221, the boundary marker objects identifying the ownership of the objects being promoted are dropped. Boundary marker objects are not referenced, so they are considered to be dead. Moreover, boundary marker objects are not promoted to old generation 221, and so they do not occupy any space in old generation 221. Additionally, boundary marker objects are not used in full garbage-collection operations, so they do no affect the time required to perform a full garbage-collection operation.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for keeping track of memory usage of tasks in a shared heap without performing a full garbage-collection operation, the method comprising:
   determining a memory usage by each task in a young generation of the shared heap; and
   adding the memory usage for each task in the young generation of the shared heap to a global memory usage for each task obtained during a preceding full garbage-collection operation to produce an actual memory usage for each task.

2. The method of claim 1, wherein determining the memory usage for each task in the young generation of the shared heap involves performing a young generation garbage-collection operation on the young generation of the shared heap, wherein the memory usage for each task in the young generation of the shared heap is determined when live objects in the young generation of the shared heap are garbage collected.

3. The method of claim 2, wherein performing the young generation garbage-collection operation involves:
   performing a marking operation to mark live objects in the young generation of the shared heap; and
   for each object in the young generation of the shared heap, identifying a task that owns the object,
      if the object has been marked by a preceding marking operation, promoting the object to an old generation of the shared heap, and
      adding the memory usage for each object to the global memory usage for the corresponding owning task.

4. The method of claim 3, wherein identifying the task that owns the object involves finding an object that is a boundary marker, wherein a boundary marker acts as a delimiter separating objects belonging to different tasks, wherein the object is owned by the task that is identified by the last boundary marker preceding the object.

5. The method of claim 3, wherein determining the task that owns the object further involves examining a header of the object for an identifier that identifies the task.

6. The method of claim 5, wherein the identifier is only present in objects in the young generation of the shared heap, and is removed when the object is promoted to the old generation of the shared heap.

7. The method of claim 3, wherein determining the task that owns the object further involves examining a card table to determine ownership, wherein each task has a separate card table.

8. The method of claim 1, wherein the shared heap is located within a memory-constrained computing device.

9. The method of claim 1, wherein the shared heap is located within a platform-independent virtual machine.

10. The method of claim 9, wherein the platform-independent virtual machine is a JAVA Virtual Machine.

11. A computer-readable storage medium storing instructions that when executed by a computer cause the computer to perform a method for keeping track of memory usage of tasks in a shared heap without performing a full garbage-collection operation, the method comprising:
   determining a memory usage by each task in a young generation of the shared heap; and
   adding the memory usage for each task in the young generation of the shared heap to a global memory usage for each task obtained during a preceding full garbage-collection operation to produce an actual memory usage for each task.

12. The computer-readable storage medium of claim 11, wherein determining the memory usage for each task in the young generation of the shared heap involves performing a young generation garbage-collection operation on the young generation of the shared heap, wherein the memory usage for each task in the young generation of the shared heap is determined when live objects in the young generation of the shared heap are garbage collected.

13. The computer-readable storage medium of claim 12, wherein performing the young generation garbage-collection operation involves:
performing a marking operation to mark live objects in the young generation of the shared heap; and
for each object in the young generation of the shared heap,
identifying a task that owns the object,
if the object has been marked by a preceding marking operation, promoting the object to an old generation of the shared heap, and
adding the memory usage for each object to the global memory usage for the corresponding owning task.

14. The computer-readable storage medium of claim 13, wherein identifying the task that owns the object involves finding an object that is a boundary marker, wherein a boundary marker acts as a delimiter separating objects belonging to different tasks, wherein the object is owned by the task that is identified by the last boundary marker preceding the object.

15. The computer-readable storage medium of claim 13, wherein determining the task that owns the object further involves examining a header of the object for an identifier that identifies the task.

16. The computer-readable storage medium of claim 15, wherein the identifier is only present in objects in the young generation of the shared heap, and is removed when the object is promoted to the old generation of the shared heap.

17. The computer-readable storage medium of claim 13, wherein determining the task that owns the object further involves examining a card table to determine ownership, wherein each task has a separate card table.

18. The computer-readable storage medium of claim 11, wherein the shared heap is located within a memory-constrained computing device.

19. The computer-readable storage medium of claim 11, wherein the shared heap is located within a platform-independent virtual machine.

20. The computer-readable storage medium of claim 19, wherein the platform-independent virtual machine is a JAVA Virtual Machine.

21. An apparatus for keeping track of memory usage of tasks in a shared heap without performing a full garbage-collection operation, comprising:

a memory utilization mechanism configured to determine a memory usage by each task in a young generation of the shared heap; and
a memory summation mechanism configured to add the memory usage for each task in the young generation of the shared heap to a global memory usage for each task obtained during a preceding full garbage-collection operation to produce an actual memory usage for each task.

22. The apparatus of claim 21, wherein the memory utilization mechanism is further configured to perform a young generation garbage-collection operation on the young generation of the shared heap, wherein the memory usage for each task in the young generation of the shared heap is determined when live objects in the young generation of the shared heap are garbage collected.

23. The apparatus of claim 22, wherein the memory utilization mechanism is further configured to:
perform a marking operation to mark live objects in the young generation of the shared heap; and
for each object in the young generation of the shared heap,
identify a task that owns the object,
promote the object to an old generation of the shared heap if the object has been marked by a preceding marking operation, and
add the memory usage for each object to the global memory usage for the corresponding owning task, if the object has been marked by the preceding marking operation.

24. The apparatus of claim 23, wherein the memory utilization mechanism is further configured to find an object that is a boundary marker, wherein a boundary marker acts as a delimiter separating objects belonging to different tasks, wherein the object is owned by the task that is identified by the last boundary marker preceding the object.

25. The apparatus of claim 23, wherein the memory utilization mechanism is further configured to examine a header of the object for an identifier that identifies the task.

26. The apparatus of claim 25, wherein the identifier is only present in objects in the young generation of the shared heap, and is removed when the object is promoted to the old generation of the shared heap.

27. The apparatus of claim 23, wherein the memory utilization mechanism is further configured to examine a card table to determine ownership of the task, wherein each task has a separate card table.

28. The apparatus of claim 21, wherein the shared heap is located within a memory-constrained computing device.

29. The apparatus of claim 21, wherein the shared heap is located within a platform-independent virtual machine.

30. The apparatus of claim 29, wherein the platform-independent virtual machine is a JAVA Virtual Machine.

* * * * *